United States Patent [19]

Bosland

[11] 4,303,172

[45] Dec. 1, 1981

[54] COMPASS HOOD

[76] Inventor: James M. Bosland, 189 Chestnut Dr., Wayne, N.J. 07470

[21] Appl. No.: 177,570

[22] Filed: Aug. 13, 1980

Related U.S. Application Data

[63] Continuation of Ser. No. 945,849, Sep. 26, 1978, abandoned.

[51] Int. Cl.³ ............................................. B65D 43/14
[52] U.S. Cl. .................................. 220/252; 220/346; 220/350; 220/408; 206/305; 33/364
[58] Field of Search ............... 220/408, 252, 350, 346; 33/364; 206/305

[56] References Cited

U.S. PATENT DOCUMENTS

| | | | |
|---|---|---|---|
| 1,462,818 | 7/1923 | Pierce | 220/408 |
| 2,078,665 | 4/1937 | Horsley | 220/350 |
| 2,185,284 | 1/1940 | Wilson | 220/252 |
| 2,250,729 | 7/1941 | Smith et al. | 220/252 |
| 2,850,025 | 9/1958 | Bond | 220/252 |
| 2,864,526 | 12/1958 | Buss | 220/252 |
| 3,116,744 | 1/1964 | Hager | 220/408 |
| 3,651,979 | 3/1972 | Severson | 220/346 |
| 4,162,024 | 7/1979 | Shanley | 220/350 |

FOREIGN PATENT DOCUMENTS

| 801376 | 4/1936 | France | 220/350 |
|---|---|---|---|
| 1408868 | 4/1965 | France | 220/346 |

OTHER PUBLICATIONS

Manhattan Marine Catalog No. 75, p. 218, 1975.

*Primary Examiner*—Joseph Man-Fu Moy
*Attorney, Agent, or Firm*—Darby & Darby

[57] ABSTRACT

A compass hood construction is disclosed capable of closing entirely the face of a compass yet also providing higher viewing angles than is usually possible with available hood constructions. An outer stationary hood segment frictionally engages an annular flange in which the compass is mounted. Mounted within the hood segment are inner and outer hood sectors which are pivotally pinned to the stationary hood segment. The inner hood sector includes a tongue which engages a groove in the interior wall of the outer hood sector. When fully opened, the hood is defined essentially by the stationary hood segment. When fully extended, the inner and outer hood sectors form a hemispherical enclosure with the hood segment, completely enclosing the compass face.

6 Claims, 6 Drawing Figures

U.S. Patent   Dec. 1, 1981   4,303,172
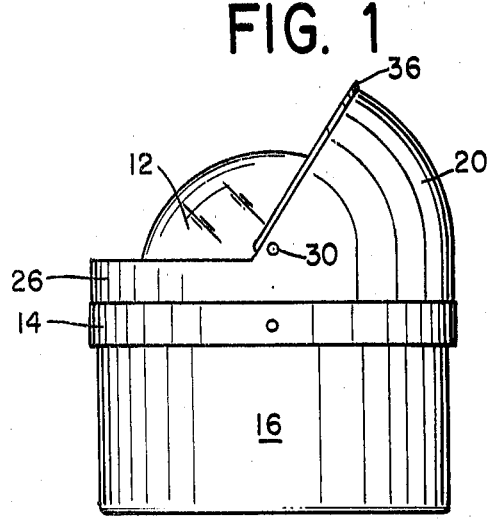
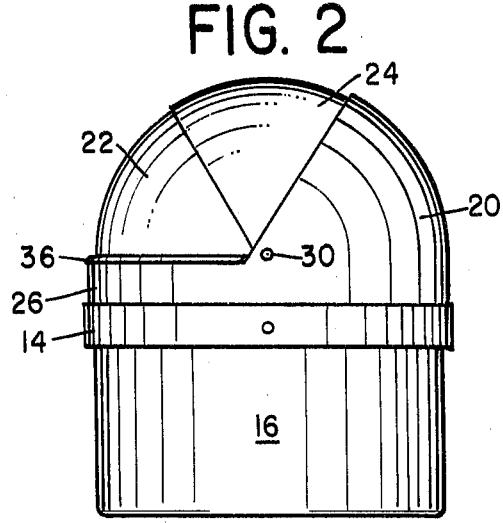
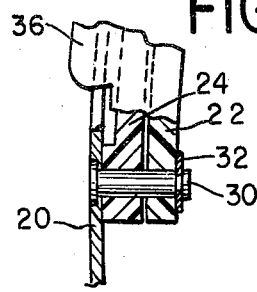
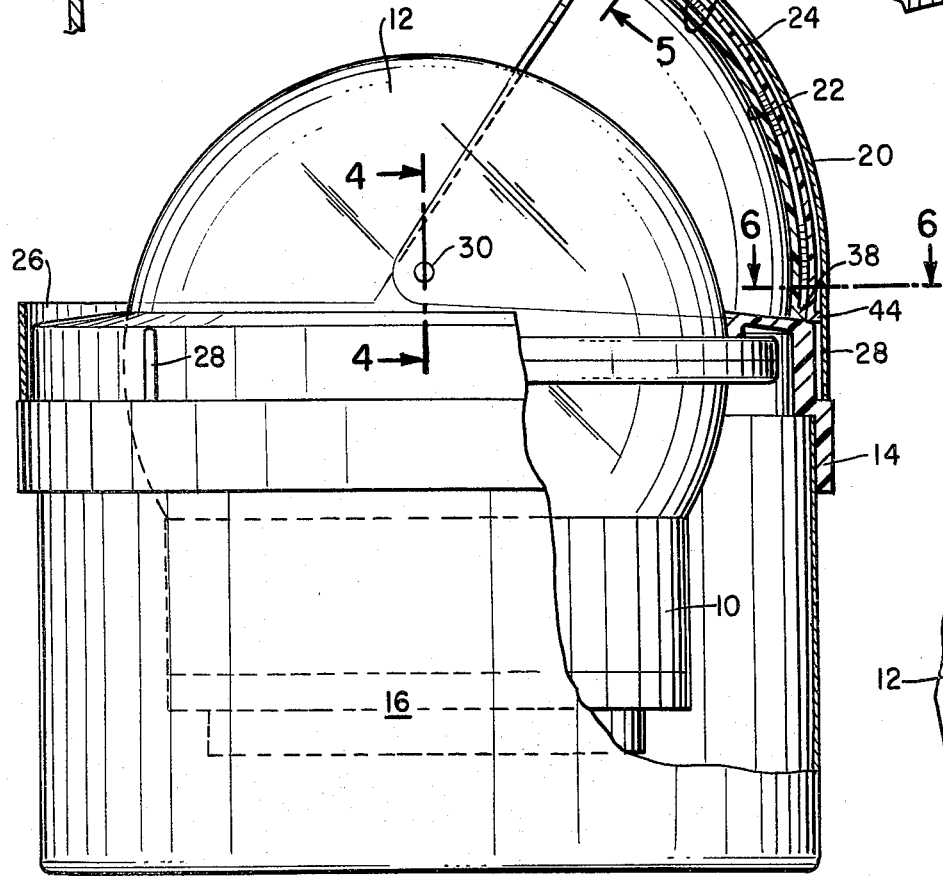
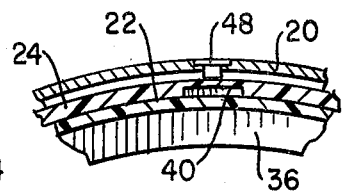
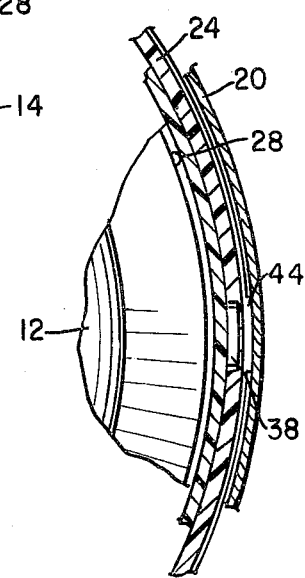

COMPASS HOOD

This is a continuation, of application Ser. No. 945,849, filed Sept. 26, 1978, now abandoned.

BACKGROUND OF THE INVENTION

This invention relates to hood constructions for use with navigational compasses. More particularly, this invention relates to a hood construction capable of closing entirely a boat's compass but which may be adjusted to provide viewing angles higher than those available with existing hood constructions.

It is often desirable to partially cover the compass of a boat to avoid glare from light reflected from the sun. When the compass is not in use, it should be covered entirely to protect it from direct sunlight. There are various commercially available hood constructions which serve these purposes. Such constructions usually limit the viewing angle to a relatively low angle and cannot be adjusted to optimize the trade-off between glare reduction and maximum viewing angle.

In the case of a sailboat, it is necessary that the compass be viewed from a higher viewing angle when mounted on a pedistal steerer than is necessary in a powerboat. Existing hood constructions which serve to reduce glare and enclose entirely the compass when it is not in use, also limit the viewing angle to an angle lower than that which is desirable in many situations encountered in sailing.

OBJECT OF THE INVENTION

The object of this invention is to provide a hood construction for a compass which is capable of covering the entire compass face when the compass is not in use and yet which may also be adjusted during use to provide high viewing angles.

SUMMARY OF THE INVENTION

Briefly, in accordance with the invention, a compass hood comprises a three-piece construction including a fixed metal hood segment to which are pivoted inner and outer plastic hood sectors. The inner sector includes a tongue which engages a groove within the outer section to enable both of the plastic hood sectors to be extended around the compass. The parts frictionally engage each other so that the hood may be held open in any desired position.

THE DRAWINGS

In the drawings

FIG. 1 is a side elevational view showing the hood completely open;

FIG. 2 is a side elevational view showing the hood completely closed;

FIG. 3 is a plan view, partially in section, showing the details of the preferred construction;

FIG. 4 is a sectional view along the line 4—4 of FIG. 3;

FIG. 5 is a sectional view along the line 5—5 of FIG. 3; and

FIG. 6 is a sectional view along the line 6—6 of FIG. 3.

In the drawings, the body of a representative compass is shown at 10. The compass includes a transparent hemispherical dome 12 suitably secured to the body 10. The compass body is supported in a compass by ring 14 which serves to retain the compass within a generally cylindrical housing 16. This construction as so far described is conventional for a binnacle mounted compass, which, conventionally, will be mounted on a suitable pedestal or the like. In the case of a flush mounted compass, housing 16 is not required.

In accordance with the invention, a hood construction for enclosing the dome 12 comprises a stationary metal hood segment 20 within which an inner plastic hood sector 22 and an outer plastic hood sector 24 are pivotally mounted. In the fully open position, the three parts of the hood are nested together as shown in FIG. 1.

The hood segments 20, 22, and 24 are spherically shaped so that when the device is completely closed as explained below, a hemispherical cover for the dome 12 is formed.

The fixed metal sector 20 also includes an annular base 26 which fits over ring 14 and frictionally engages four retaining bosses 28 extending outwardly from the ring 14. The friction fit should be tight enough so that the metal sector 20 remains stationary during use but can, if desired, be readjusted manually.

A pair of pivot pins 30 are cold-swaged to the metal sector 20 and extend inwardly through aligned apertures (not numbered) within the inner and outer plastic sectors 22 and 24. C-rings 32 may be attached to the inner ends of the pins 30 to retain sectors 22 and 24 in place.

The inner plastic hood sector 22 includes a peripheral rim 36 which may be grasped by the user to close the hood. At the opposite edge of sector 22, a tongue 38 extends outwardly into a groove 40 formed within the interior surface of the outer hood sector 24. At the upper end of groove 40 is a lip 42 which is engaged by tongue 38 when the inner hood sector 22 is extended. The parts are dimensioned so that the tongue 38 exerts pressure against the bottom of the groove 40 enabling the respective parts to be moved with ease but, at the same time, allowing the parts to retain their relative positions when no pressure is applied because of a spring loading effect. Likewise, the outer plastic hood sector 24 includes an outwardly extending friction tab 44 which engages the inner surface of the metal hood sector 20 to thereby effectively spring load the plastic hood sectors 22 and 24 against the outer metal segment 20.

A stop pin 48 extends inwardly from the upper surface of the metal hood sector 20. Stop pin 48 is adapted to engage the friction tab 44 for limiting the movement of the two plastic hood sectors 22 and 24.

When the hood is fully opened, the metal sector 20 is the only limiting factor for the viewing line which therefore may be very high compared to presently available devices. This high viewing angle is particularly desirable for sailing boats. The hood may be closed entirely by the telescoping plastic hood sectors 20 and 22, or they may be retained in any desired intermediate position during use to facilitate compass reading for all light conditions.

To still further increase the viewing angle, the included angle of metal hood segment 20 may be reduced, in which case it may be desirable to use more than two plastic hood sectors as illustrated.

The capability of adjusting the hood enclosure will be useful for power boats during night operation where partial closure of the hood can be used to prevent the reflection of light from the compass from affecting visibility through the boat's windshield.

What is claimed is:

1. A hood construction for use with a compass having an annular compass ring, comprising:
   a stationary hood segment including a spherical sector and an annular base adapted to be secured to a mounting member,
   outer and inner hood sectors pivotally mounted interiorally of said spherical sector, said hood sectors being rotatable relative to each other and relative to said spherical sector, said hood sectors and spherical sector forming a hemispherically shaped hood for said compass when fully extended,
   projections extending between the exterior of said outer hood sector and the interior of said spherical sector, providing friction therebetween to hold said outer hood sector in any position between fully extended and fully retracted, relative to said spherical sector, and projections extending between the exterior of said inner hood sector and the interior of said outer hood sector, providing friction therebetween to hold said inner hood sector in any position between fully extended and fully retracted, relative to said outer hood sector.

2. A hood construction according to claim 1, said spherical sector covering an angle of 90° or less on an X-Y plane as viewed from a Z axis which runs through the pivotal mounts of said hood sectors.

3. A hood construction according to claims 1 or 2, further including an elongated groove terminating in a retaining lip at its upper edge defined in said outer hood sector, and wherein said inner hood sector to outer hood sector projections consist of a tongue projecting outwardly from said inner hood sector at its lower edge into frictional contact with said groove and adapted to engage said retaining lip.

4. A hood construction according to claims 1 or 2, wherein said outer hood sector to spherical sector projections consist of a friction tab extending outwardly from the outer hood sector at its lower edge, adapted to frictionally engage the inner surface of said spherical sector.

5. A hood construction according to claim 3, wherein said outer hood sector to spherical sector projections consist of a friction tab extending outwardly from the outer hood sector at its lower edge adapted to frictionally engage the inner surface of said spherical sector.

6. A hood construction according to claim 5 wherein said compassing includes a plurality of projections for frictionally engaging the interior surface of the base of said stationary hood segment.

* * * * *